United States Patent
Lin et al.

(10) Patent No.: US 10,852,885 B2
(45) Date of Patent: Dec. 1, 2020

(54) TOUCH CONTROLLER, TOUCH DISPLAY SYSTEM AND METHOD FOR SYNCHRONIZING TOUCH DISPLAY

(71) Applicant: SHENZHEN WEITONGBO TECHNOLOGY CO., LTD., Guangdong (CN)

(72) Inventors: Yung-Fu Lin, Guangdong (CN); Cheng-Chung Hsu, Guangdong (CN)

(73) Assignee: SHENZHEN WEITONGBO TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 16/409,048

(22) Filed: May 10, 2019

(65) Prior Publication Data
US 2019/0265859 A1    Aug. 29, 2019

Related U.S. Application Data

(63) Continuation of application No. PCT/CN2018/076876, filed on Feb. 14, 2018.

(51) Int. Cl.
*G06F 3/041* (2006.01)
*G09G 3/36* (2006.01)

(52) U.S. Cl.
CPC ........ *G06F 3/04166* (2019.05); *G06F 3/0412* (2013.01); *G09G 3/3611* (2013.01)

(58) Field of Classification Search
CPC .. G06F 3/04166; G06F 3/0412; G09G 3/3611
See application file for complete search history.

(56) References Cited

U.S. PATENT DOCUMENTS

| | | | |
|---|---|---|---|
| 9,524,697 B2 | 12/2016 | Ningrat et al. | |
| 2012/0206383 A1 | 8/2012 | Ha et al. | |
| 2014/0267152 A1* | 9/2014 | Curtis | G06F 3/041662 345/174 |

(Continued)

FOREIGN PATENT DOCUMENTS

| | | |
|---|---|---|
| CN | 102929460 A | 2/2013 |
| CN | 103376961 A | 10/2013 |

(Continued)

OTHER PUBLICATIONS

English Abstract Translation of Foreign Patent Document CN102929460A.

(Continued)

*Primary Examiner* — Michael Pervan
(74) *Attorney, Agent, or Firm* — WPAT, P.C., Intellectual Property Attorneys; Anthony King

(57) ABSTRACT

The present disclosure provides a touch controller, which includes, a monitoring circuit, configured to configured to detect a sensing signal generated via a touch sensor when a display panel is driven, and obtain at least one synchronizing signal according to the sensing signal; and a touch detecting circuit, configured to output a touch driving signal to the touch sensor according to the synchronizing signal. The touch controller provided by the present disclosure reduces the signal interference between the touch controller and the display driving circuit by using a touch sensor to obtain the synchronizing signal from the display panel.

20 Claims, 5 Drawing Sheets

(56) References Cited

U.S. PATENT DOCUMENTS

| | | | | |
|---|---|---|---|---|
| 2015/0331535 A1* | 11/2015 | Li | ............................ | G06F 3/044 |
| | | | | 348/174 |
| 2016/0098150 A1* | 4/2016 | Kang | ....................... | G06F 1/163 |
| | | | | 345/174 |
| 2016/0202830 A1* | 7/2016 | Lee | ........................ | G06F 3/0416 |
| | | | | 345/174 |
| 2016/0253021 A1* | 9/2016 | Syu | .......................... | G06F 3/041 |
| | | | | 345/174 |

FOREIGN PATENT DOCUMENTS

| | | |
|---|---|---|
| CN | 104199577 A | 12/2014 |
| CN | 105320319 A | 2/2016 |

OTHER PUBLICATIONS

English Abstract Translation of Foreign Patent Document CN103376961A.
English Abstract Translation of Foreign Patent Document CN104199577A.
English Abstract Translation of Foreign Patent Document CN105320319A.
International Search Report of PCT/CN2018/076876.

* cited by examiner

TOUCH CONTROLLER, TOUCH DISPLAY SYSTEM AND METHOD FOR SYNCHRONIZING TOUCH DISPLAY

CROSS REFERENCE TO RELATED APPLICATIONS

The present application is a continuation of international application No. PCT/CN2018/076876, filed on Feb. 14, 2018, of which is incorporated herein by reference in its entirety.

TECHNICAL FIELD

The present disclosure involves the touch display technology, and particularly touch controllers, touch display systems and methods for synchronizing the touch display.

BACKGROUND

With the development and advancement of the technology, the thickness of the touch display screen is getting thinner; hence, when a display driving circuit of the touch display screen drives the display screen to display an image, an interference to the touch control circuit takes place accompanyingly. Conventionally, to achieve the display synchronization, in the touch display screen system, additional pins are required for the connection between the display driving circuit configured to drive display screen and the touch control circuit (or touch controller) configured to detect the touch sensor, so that the display driving circuit and the touch control circuit can be synchronized; in other words, pins for outputting the synchronizing signal shall be disposed at the display driving circuit, whereas corresponding pins for receiving the synchronizing signal shall be disposed at the touch controller. However, according to the current practice of the present industry, the display driving circuit and the touch controller are often manufactured by different manufacturer, and accordingly, during the design and manufacturing processes, said manufacturers shall cooperate with each other, so that the synchronizing signal can be transmitted via the pins, thereby achieving the synchronizing between the display driving circuit and the touch control circuit. In this way, the design and manufacturing process for both the manufacturer for the display driving circuit and the manufacturer for the touch controller would become complex and lack flexibility. In addition, when the resolution of the display panel increases, the interference between the display driving circuit and the touch control circuit, as well as the complexity for synchronization, also increases. Accordingly, there is a need for further improvement and innovation in the related art.

BRIEF SUMMARY OF THE INVENTION

In view of the foregoing, one purpose of the present disclosure is to provide a touch controller to address the disadvantages of the conventional art.

The touch controller according to one embodiment of the present disclosure includes: a monitoring circuit, configured to configured to detect a sensing signal generated via a touch sensor when a display panel is driven, and obtain at least one synchronizing signal according to the sensing signal; and a touch detecting circuit, configured to output a touch driving signal to the touch sensor according to the synchronizing signal.

Another aspect of the present invention provides a touch display system, including a display driving circuit and a touch controller, wherein the display driving circuit is configured to drive the display panel, and the touch controller is configured to detect a touch operation sensed by a touch sensor and includes a monitoring circuit and a touch detecting circuit, wherein the monitoring circuit is configured to detect a sensing signal generated via the touch sensor when the display panel is driven by the display driving circuit, and obtain at least one synchronizing signal according to the sensing signal; and the touch detecting circuit is configured to output a touch driving signal to the touch sensor according to the synchronizing signal.

In one embodiment, the sensing signal is a stray current generated by the coupling of a panel driving signal between the touch sensor and the display panel, wherein the panel driving signal is outputted when the display driving circuit drives the display panel.

In one embodiment, the sensing signal is transmitted to the monitoring circuit via a coupling capacitor formed between a scan line or a display pixel of the display panel and a sensing electrode of the touch sensor.

In one embodiment, the synchronizing signal is obtained directly according to the sensing signal, or the synchronizing signal is extracted or calculated from the sensing signal.

In one embodiment, the monitoring circuit extracts the at least one synchronizing signal according to the frequency and phase of the sensing signal.

In one embodiment, the monitoring circuit and the touch detecting circuit are integrated or packed as one piece.

In one embodiment, the touch detecting circuit is formed as a single chip, and the monitoring circuit is disposed outside of the touch detecting circuit.

In one embodiment, the monitoring circuit and the touch controller multiplex the at least one sensing electrode of the touch sensor.

In one embodiment, when the monitoring circuit obtains the sensing signal, a driving electrode of the touch sensor is driven by the touch driving signal outputted by the touch detecting circuit.

In one embodiment, the frequency of the touch driving signal and the frequency of the panel driving signal driving the display panel are different.

In one embodiment, the synchronizing signal includes at least one of a horizontal synchronizing signal and a vertical synchronizing signal.

The third aspect of the present invention provides a method for synchronizing a touch display for use in a touch display system, wherein the touch display system includes a display panel, a display driving circuit, a monitoring circuit and a touch controller; the method includes:
  using the display driving circuit to drive the display panel to generate a sensing signal;
  using the monitoring circuit to detect the sensing signal and generate at least one synchronizing signal according to the sensing signal; and
  using the touch controller to synchronize with the display panel according to the at least one synchronizing signal.

In one embodiment, the touch controller obtains the synchronizing signal according to the frequency or phase of the sensing signal.

In one embodiment, the sensing signal is a stray current generated by the coupling of a panel driving signal between the touch sensor and the display panel, wherein the panel driving signal is outputted when the display driving circuit drives the display panel.

In one embodiment, when the monitoring circuit obtains the sensing signal, a driving electrode of the touch sensor is driven by the touch driving signal outputted by the touch detecting circuit.

In one embodiment, the frequency of the touch driving signal and the frequency of the panel driving signal driving the display panel are different.

The touch controller according to the embodiments of the present disclosure synchronizes the touch controller and the display driving circuit using the synchronizing signal, so as to reduces the interference between the touch controller and the display driving circuit, thereby ameliorating the disadvantages of the conventional art.

DETAILED DESCRIPTION

Purposes, technical solutions and advantages of the present disclosure are best understood from the following detailed description when read with the accompanying drawings. It is noted that, embodiments provided herein are for discussing the present disclosure, and shall not be construed as limiting to the present disclosure.

Figure 1:
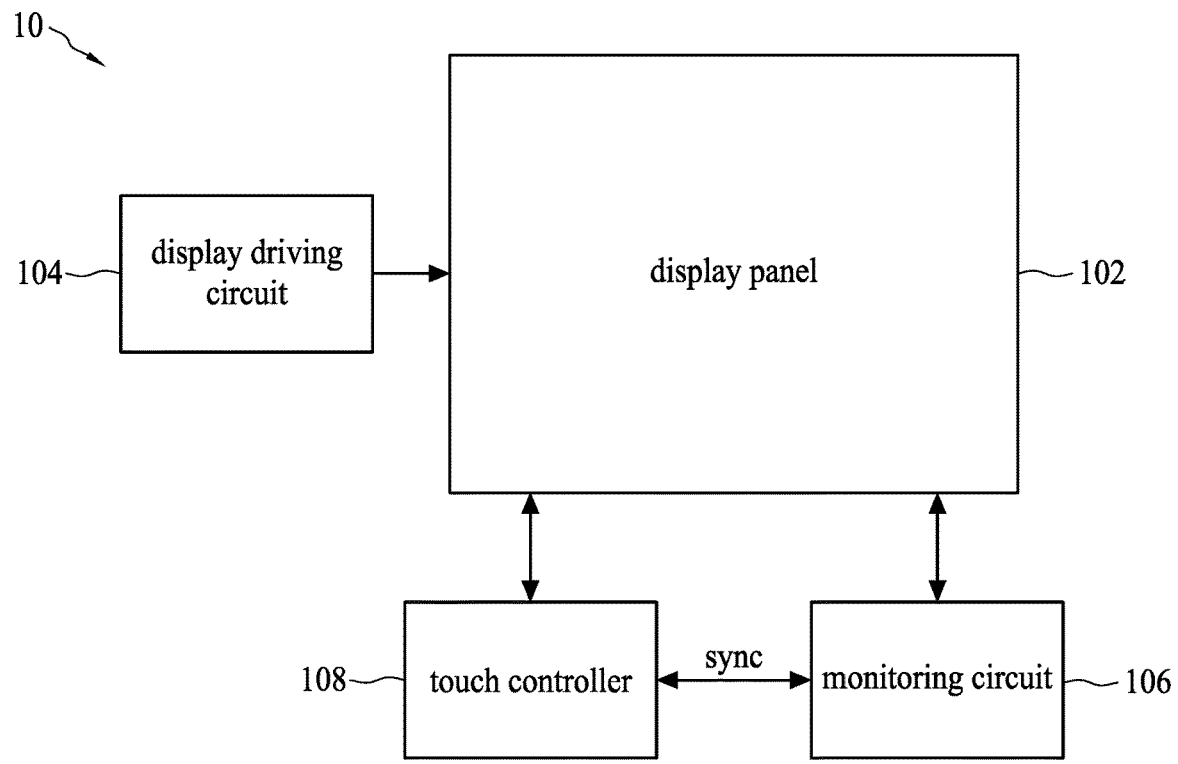
FIG. 1 is a schematic view of a touch display system according to one embodiment of the present disclosure.

Reference is made to FIG. 1, which is a schematic view of a touch display system 10 according to one embodiment of the present disclosure. The touch display system 10 includes a display panel 102, a display driving circuit 104, a monitoring circuit 106 and a touch controller 108. The touch display system 10 may be a touch display with touch-control function, such as a smart phone, tablet computer, etc. The display panel 102 may include a liquid crystal display panel, and the display driving circuit 104 is configured to drive the display panel 102; for example, the display driving circuit 104 may include a timing controller, a source driver, and a gate driver, wherein each pixel of the liquid crystal display panel is driven by the source driver and the gate driver according to the synchronizing signal and the control signal of the timing controller. The display panel 102 may also include the touch sensor (not shown in the drawing) therewithin, or the display panel 102 and the touch sensor may be disposed separately. The monitoring circuit 106 is configured to detect a sensing signal generated by the display driving circuit 104 when the display driving circuit 104 drives the display panel 102, and extract at least one synchronizing signal "sync" from the sensing signal; for example, a horizontal synchronizing signal "H_sync" for synchronizing each scan line of the panel or a gate driver vertical synchronizing signal "V_sync" for synchronizing each image. In this way, the touch controller 108 may drive and sense the touch sensor according to the synchronizing signal sync, thereby achieving the touch display synchronization with the display panel 102; that is, the display of the display panel is synchronized with the touch detection of the touch sensor.

Specifically, to make sure that the timing of the touch controller and the timing of the panel display are the same, it is necessary to synchronize the operation of the panel and the operation of the touch controller. As compared with the interference sensed in the conventional art due to the introduction of extra pins or wirings between the display driving circuit 104 and touch controller 108, the monitoring circuit 106 according to the present disclosure achieves the synchronization between the touch controller 108 and the display panel 102 by sensing the sensing signal generated when the display driving circuit 104 drives the display panel 102 and extracting the synchronizing signal sync of the sensing signal, and then transmitting the synchronizing signal sync to the touch controller 108. In one embodiment, the sensing signal may be a stray current generated by the coupling between the touch controller 108 or the touch sensor and the display panel 102; then, the monitoring circuit 106 extracts the synchronizing signal sync according to the frequency and phase of the sensing signal. For example, when the gate driver of the display driving circuit 104 drives a scan line of the display panel 102 under the control of the synchronizing signal, a coupling capacitor is formed between the scan line and a sensing electrode of a touch sensor (not shown in the drawing) of the panel, thereby forming the stray current between the touch sensor when a pixel of the display panel 102 is conducted; next, after the monitoring circuit 106 detects the stray current, the monitoring circuit 106 extracts the synchronizing signal sync according to the frequency and the phase of the stray current. Alternatively, in another embodiment, the monitoring circuit 106 may directly obtain the synchronizing signal sync via detection, thereby synchronizing the display driving circuit 104 and the touch controller 108. Still alternatively, the monitoring circuit 106 may obtain the synchronizing signal according to the period of the driving signal that is sensed when the display driving circuit 104 drives the display panel 102. For example, after the touch controller 108 detects the sensing signal, the monitoring circuit 106 may sense the sensing signal generated when the display driving circuit 104 drives the display panel 102 and the period thereof via a horizontal blanking period of the source drive or a vertical blanking period of the gate drive, thereby generating the synchronizing signal; however, the present disclosure is not limited thereto.

Figure 2:
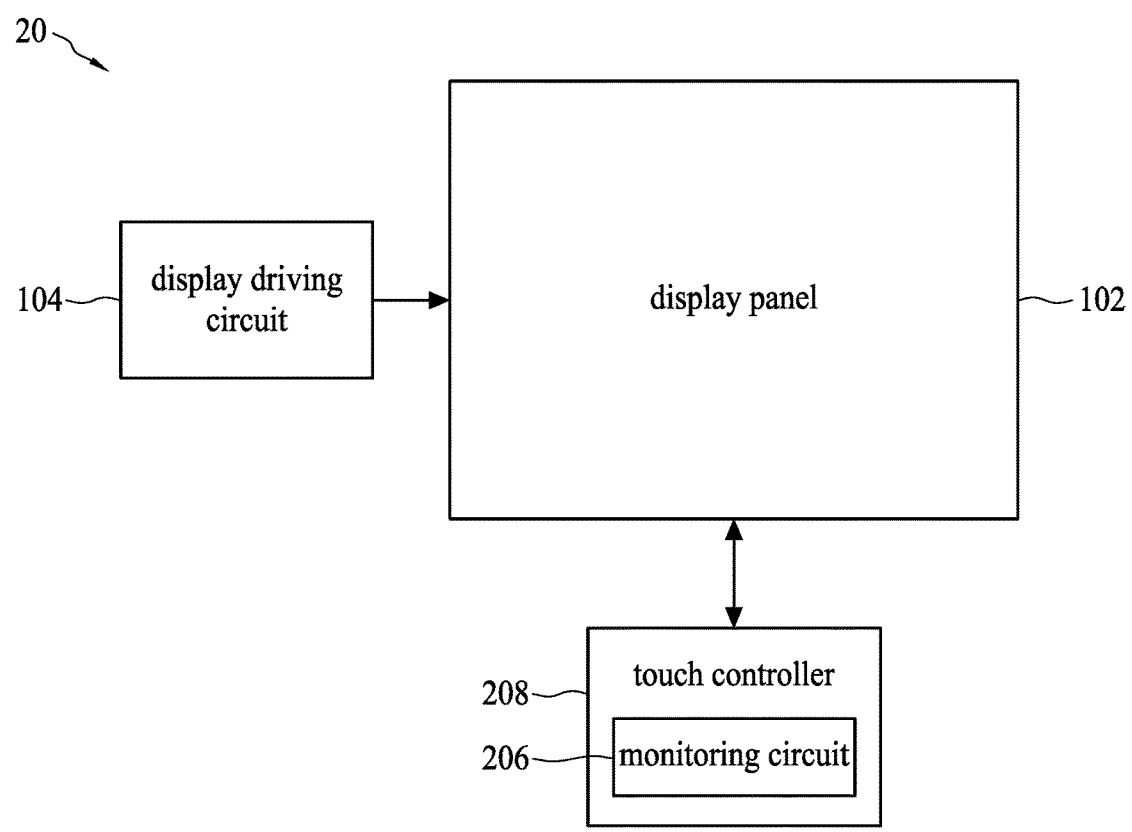
FIG. 2 is a schematic view of a touch display system according to another embodiment of the present disclosure.

Depending on the differences in applications and design ideas, the touch display system 10 may be implemented in various forms. For example, reference is made to FIG. 2, which is a schematic view of another touch display system 20 according to some embodiments of the present disclosure. The touch display system 20 may be a touch display with touch-control function, such as a smart phone, tablet computer, etc. The touch display system 20 is similar to the touch display system 10 illustrated in FIG. 1, and hence, components and signals with similar functions are indicated with the same reference numeral or symbol. The touch display system 20 differs from the touch display system 10 of FIG. 1 in that the monitoring circuit 206 is included in the touch controller 208. Hence, the circuit 206 is used to detect a sensing signal of the display panel 102, and further extract or sense at least one synchronizing signal sync, and then provide the same to the touch controller 208 for further use. In other words, in this embodiment, when the display driving circuit 104 drives the panel 102, the monitoring circuit 206 of the touch controller 208 may extract to the sensing signal to generate the synchronizing signal sync, thereby synchronizing the display of the touch controller 208 and the display panel 102. In this way, the present touch display system 20 can achieve the synchronization of the touch controller 208 and the display driving circuit 104 without the installation of extra pins for connecting the display driving circuit 104 and the touch controller 208.

As should be noted, in addition to disposing the monitoring circuit independently outside of the touch controller (e.g., the monitoring circuit 106 shown in FIG. 1), it is also feasible to dispose it in the touch controller (e.g., the monitoring circuit 206 shown in FIG. 2); however, the present disclosure is not limited thereto; both configurations are also suitable for use in the present disclosure. However, in the above-mentioned case, both monitoring circuits can use the original sensing channel of the touch controller for performing the extraction or sensing of the sensing signal. For example, the monitoring circuit and the touch controller may multiplex one of the sensing electrodes of the touch sensor to detect the sensing signal caused by the driving of the display panel; the term "multiplex" here means that a connection with the sensing electrode is formed at least during a synchronizing signal detection time or touch sensing period.

Figure 3:
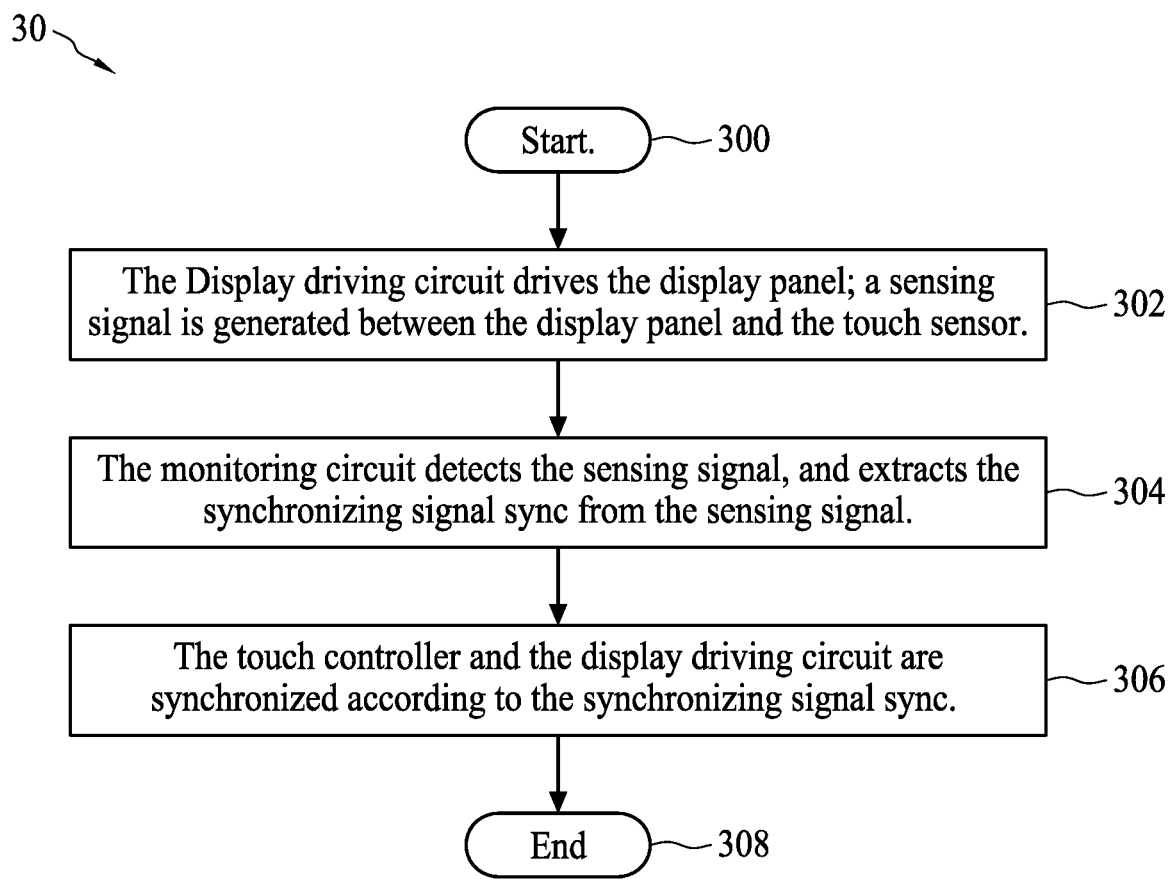
FIG. 3 is a schematic view of a synchronization method according to one embodiment of the present disclosure.

The operation principles of the touch display system 10 and 20 are discussed with reference to FIG. 3. FIG. 3 is a schematic view of a synchronization method 30 according to one embodiment of the present disclosure; detailed steps of the synchronization method 30 are as follows.

Step 300: Start.

Step 302: The Display driving circuit drives the display panel; a sensing signal is generated between the display panel and the touch sensor.

Step 304: The monitoring circuit detects the sensing signal, and extracts the synchronizing signal sync from the sensing signal.

Step 306: The touch controller and the display driving circuit are synchronized according to the synchronizing signal sync.

Step 308: End.

In view of the foregoing, by using the synchronization method 30, the touch display system 10, 20 can use the monitoring circuit 106, 206 to detect sensing signal generated between the display panel and the touch sensor when the display driving circuit 104 drives the display panel 102, and extract the synchronizing signal sync in the sensing signal, and provide the same to the touch controller 108, 208, thereby achieving the display synchronization with the display panel 102 and avoiding the interference to the touch controller 108, 208 caused by the display driving circuit 104.

Figure 4:
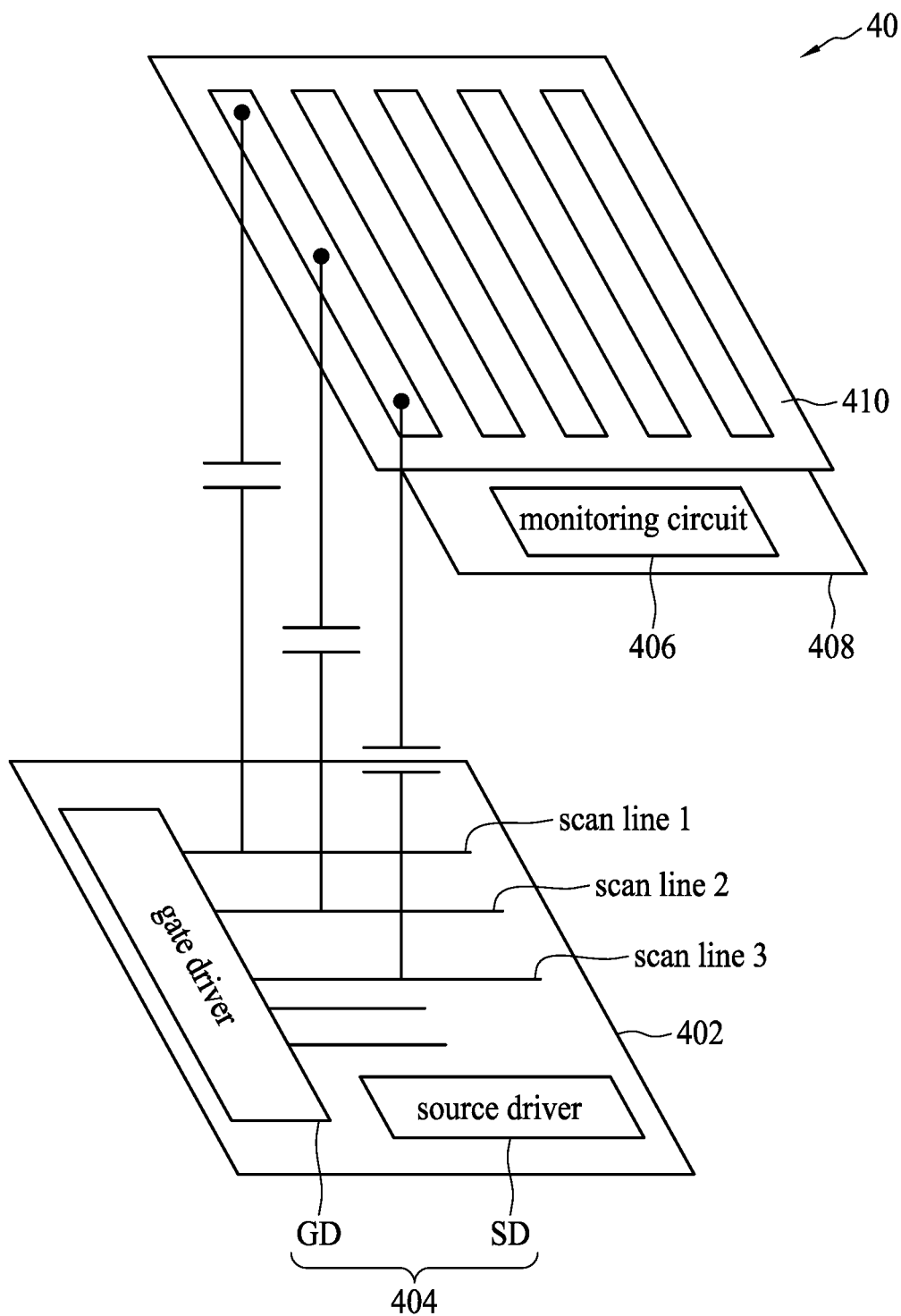
FIG. 4 is a schematic view of another touch display system according to one embodiment of the present disclosure.

Depending on the differences in applications and design ideas, the touch display system 10 may be implemented in various forms. For example, in one embodiment, reference is made to FIG. 4, which is a schematic view of another touch display system 40 according to one embodiment of the present disclosure. The touch display system 40 may be a touch display with touch-control function, such as a smart phone, tablet computer, etc. The display system 40 may be an external touch display system, including a display panel 402, a display driving circuit 404, a monitoring circuit 406, a touch controller 408 and a touch sensor 410. The display panel 402 may be various display panels such as a liquid crystal display panel, and the display driving circuit 404 is configured to drive the display panel 402. In this example, the display driving circuit 404 may include a timing controller (not shown in the drawing), a source driver SD and a gate driver GD, wherein the source driver SD and the gate driver GD drives each pixel of the display panel 402 via the scan line or data line according to the synchronizing signal and control signal of the timing controller (for the sake of brevity, only the connection between the scan line and display panel 402 is depicted in FIG. 4). The monitoring circuit 406 is included in the touch controller 408, and is configured to detect the sensing signal generated when the display driving circuit 404 drives the display panel 402, whereas the touch sensor 410 is configured to receive the pressing or touch from a user and generate a corresponding signal change according to said pressing or touch, wherein said signal change is detected by the touch controller 408 so that it can be used to determine the information such as the coordinate of the touch location. In another embodiment, the touch controller 408 may further include a touch detecting circuit (not shown in the drawing) configured to output the driving signal to the touch sensor 410 according to the synchronizing signal.

Figure 5:
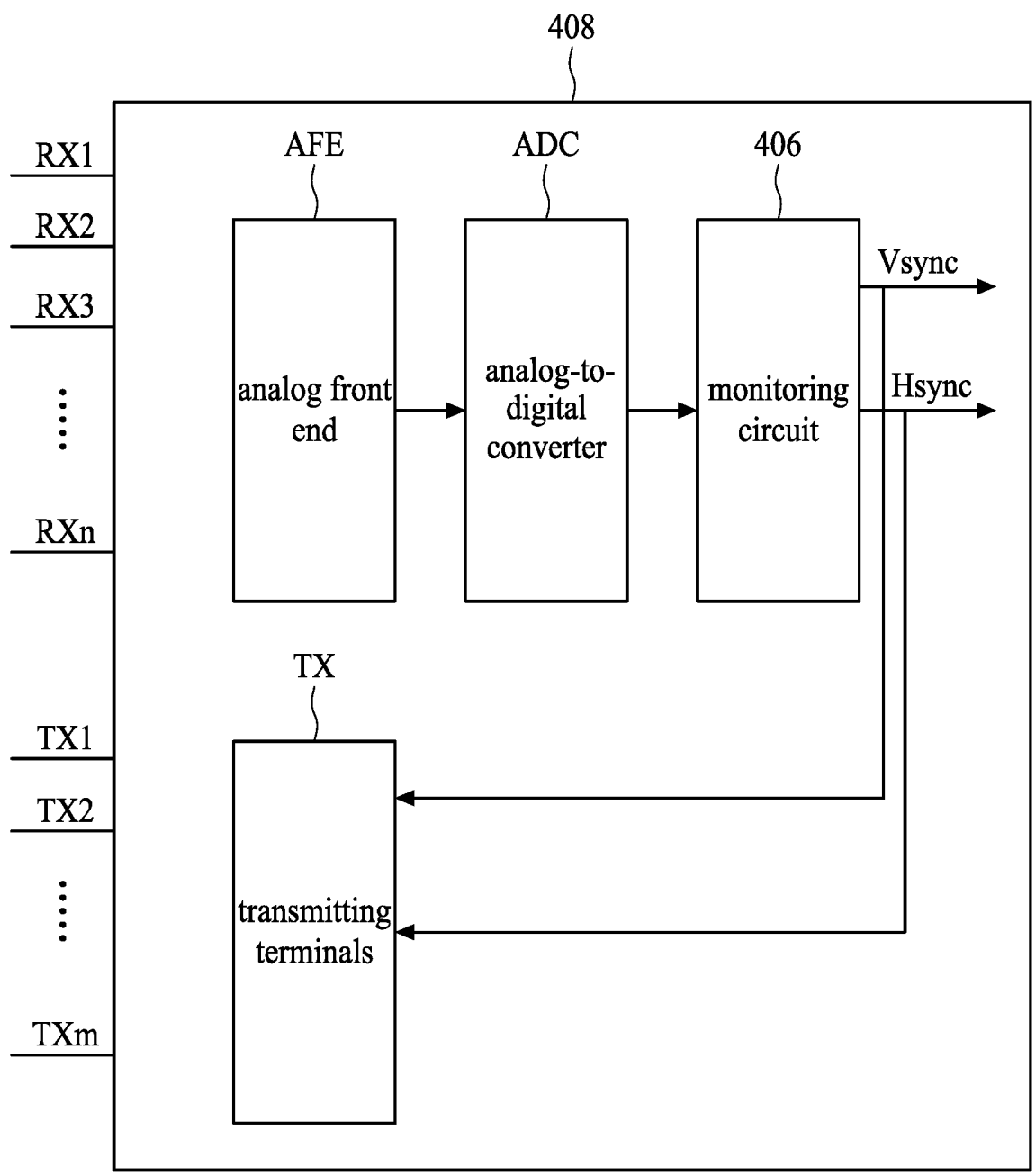
FIG. 5 is a schematic view of a touch controller of the touch display system of FIG. 4 according to one embodiment of the present disclosure.

The operation principles of the touch display system 40 are discussed with reference to FIG. 5. FIG. 5 is a schematic view of a touch controller 408 of the touch display system 40 depicted in FIG. 4 according to one embodiment of the present disclosure. The touch controller 408 may include a plurality of receiving terminals RX1~RXn, a plurality of transmitting terminals TX1~TXm, an analog front end (AFE) circuit, an analog-to-digital converter (ADC) circuit and a monitoring circuit 406. For example, when the touch sensor 410 is pressed or touched by a user, the display panel 402 is continuously driven to display the image no matter whether it receives the touch or not; specifically, the display driving circuit 404 generates the driving signal and loads it to the scan line, data line or pixel on the display panel 402; for example, the display driving circuit 404 of FIG. 4 outputs the driving signal to the scan line under the control of the synchronizing signal, whereas the data line transmits the image data to each display pixel, thereby displaying the image. Further, a coupling capacitor is formed between the scan line of the display panel 402 and the sensing electrode of the touch sensor 410, thereby resulting in a stray current, and by detecting a corresponding sensing signal using the receiving terminals (or the receiving channels, the sensing channels) RX1~RXn of the touch controller 408, and after using the AFE circuit and ADC circuit to convert the sensing signal, the monitoring circuit 406 may further generate synchronizing signals Vsync, Hsync by extraction or sensing according to the frequency and the phase of the stray current generated between the scan line, data line or pixel of the display panel 402 and the touch sensor 410. Finally, by using the transmitting terminals TX1~TXm to provide the synchronizing signal to the touch controller 408, it is feasible to achieve the display synchronization between the touch controller 408 and the display panel 402. Further, the monitoring circuit 406 may also use the frequency and the phase of the stray current generated between the display driving circuit 404 and the touch sensor 410 when the display driving circuit 404 drives the data line or pixel to extract synchronizing signals Vsync, Hsync; however, the present disclosure is not limited thereto. It should be noted that there is no need to dispose extra electrodes specifically for generating the sensing signal in the display panel 402 of the touch display system 40; rather, under the existing structural framework, it is feasible to achieve the display synchronization between the touch controller 408 and the display driving circuit 404 by using the display driving circuit 404 and the scan line and data line of the display panel 402, and the sensing electrode of the touch sensor 410.

Figure 6:
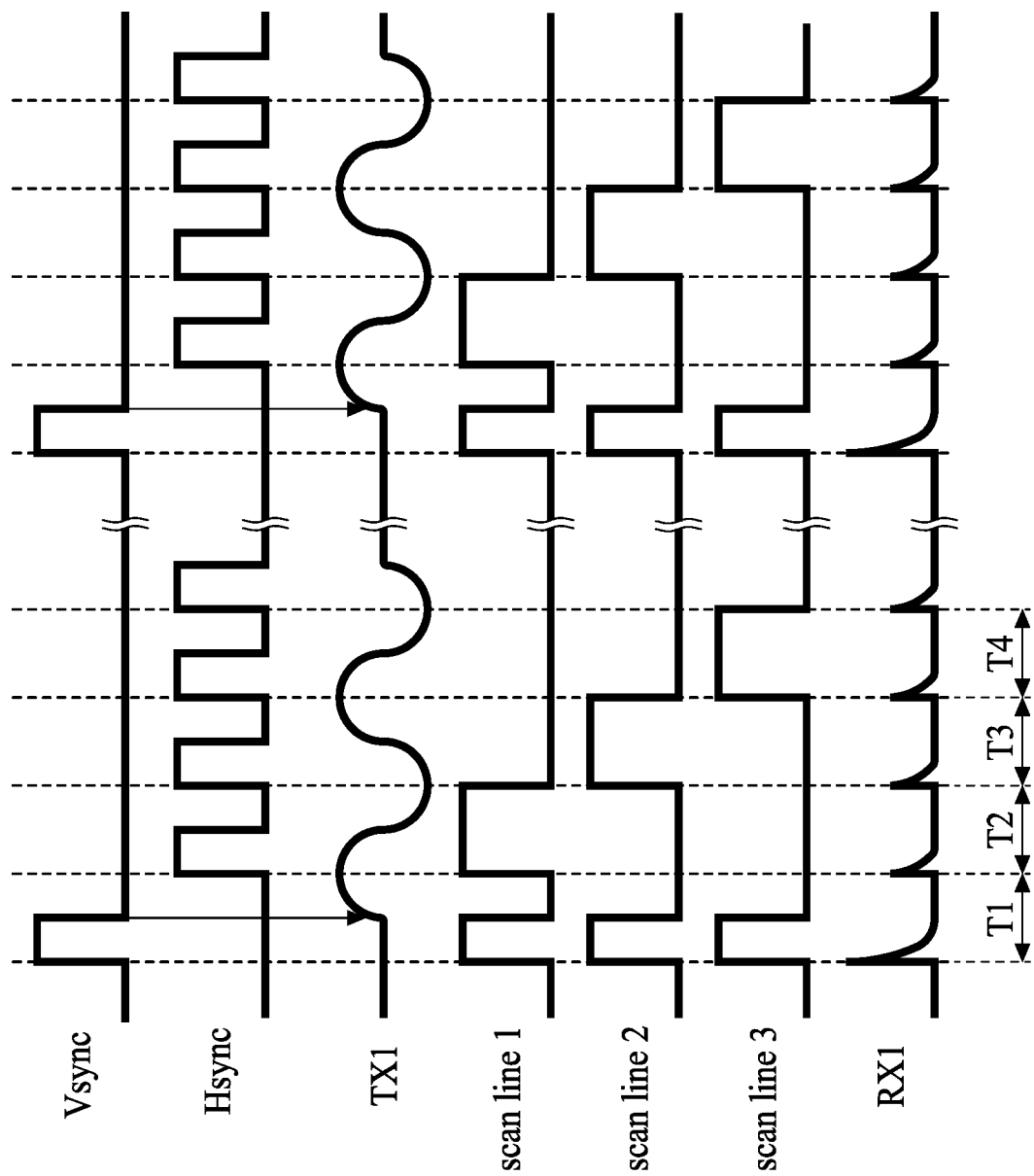
FIG. 6 is a schematic view of a signal timing of a touch display system according to one embodiment of the present disclosure.

Specifically, reference is made to FIG. 6, which is a schematic view illustrating a signal timing of the touch display system 40 according to one embodiment of the present disclosure. FIG. 6 includes the signal timings of the synchronizing signals Vsync and Hsync, scan lines 1-3, and the receiving terminals RX1 and transmitting terminal TX1 of the touch controller 408; for the sake of brevity, the signals of the transmitting terminals TX2~TXm and receiving terminals RX2~RXn are not shown in the drawing. In one embodiment, when the touch display system 40 performs the synchronization method between the display panel 402 and the touch controller 408, the display driving circuit 404 outputs the driving signal to the scan line under the control of the synchronizing signal, and a coupling capacitor is formed between the scan line and the sensing electrode of the touch sensor 410, thereby generating a stray current. Next, the receiving terminals RX1~RXn of the touch controller 408 is used to detect a corresponding sensing signal, and after the sensing signal is converted by the AFE circuit and ADC circuit, the monitoring circuit 406 may extract synchronizing signals Vsync, Hsync from the corresponding sensing signal detected by one or more of the receiving terminals RX1~RXn, so that the touch controller 408 and the display driving circuit 104 are synchronized according to synchronizing signals Vsync, Hsync. Specifically, the monitoring circuit 406 may extract the synchronizing signal Vsync from a period T1 of the driving signal of the drive scan lines 1~3, or extract the synchronizing signal Hsync from one of the periods T2, T3, T4 of the driving signal of the drive scan lines 1-3; moreover, the monitoring circuit 406 may extract the synchronizing signal Hsync according to a plurality of periods (e.g., T2~T4). In this way, the signal of the transmitting terminal TX1 may achieve synchronization according to the synchronizing signal Vsync. It should be noted that a connection between the synchronizing signal Vsync and the signal of the transmitting terminal TX1 as shown in FIG. 6 is used to indicate that the signal synchronizing signal Vsync and the signal of the transmitting terminal TX' are in the same period but with delayed synchronization states. In another embodiment, it is also feasible that the synchronizing signal Vsync and the signal of the transmitting terminal TX1 are in the same period and with a zero-delay synchronization state. Alternatively, it is feasible to extract the synchronizing signal Hsync from the driving signal of the data line, so as to achieve the synchronization state with the signal of the transmitting terminal TX1; these embodiments are all applicable to the present disclosure.

The above embodiments are provided to discuss the method for achieving the synchronization between the synchronizing signal Hsync, Vsync and the signal of the transmitting terminal TX1. Further, in one embodiment, when the touch display system 40 is performing the touch detection function and the synchronization method, the touch display system 40 may obtain the synchronizing signals Vsync, Hsync at the same time when the driving electrode or the sensing electrode of the touch sensor 410 is driven; in other words, the touch display system 40 may perform the touch detection function and the synchronization function concurrently. Alternatively, in another embodiment, the touch display system 40 may use the sensing electrode to obtain the synchronizing signals Vsync, Hsync when the sensing electrode of the touch sensor 410 is not driven (i.e., when the touch detection is not executed). In this way, as shown in FIG. 6, there is no need to dispose extra electrodes specifically for generating the sensing signal between the touch controller 408 of the touch display system 40 and the display driving circuit 104; rather, under the existing structural framework, it is feasible to achieve the synchronization between the touch controller 408 and the display driving circuit 104. It should be noted that when the touch controller 408 detects the synchronizing signal, the transmitting terminals TX1~TXm may perform the touch detection function at the same time; further, the embodiment of FIG. 6 only describes using the synchronizing signal Vsync to synchronize the touch controller 408 and the display driving circuit 104; however, the present disclosure is not limited thereto; rather, it is feasible to use the synchronizing signal Hsync to achieve the same purpose; these embodiments are all applicable to the present disclosure.

It should be noted that the foregoing embodiments are provided to discuss the spirits of the present disclosure, and persons having ordinary skill in the art may make appropriate modifications thereto. For example, other than the above mentioned examples where the monitoring circuit extracts the synchronizing signal from the sensing signal or sense the synchronizing signal, other circuits or methods with the same function can be used to implement the present disclosure; however, the present disclosure is not limited thereto; these embodiments are all applicable to the present disclosure.

In view of the foregoing, the present touch display system achieves the synchronization between the touch controller and the display driving circuit using a synchronizing signal and avoids the interference touch controller caused by the display driving circuit.

The foregoing outlines only some preferred embodiments the present invention, and shall not be construed to limit the present invention. Any change, equivalent substitution and improvement made within the spirit and principle according to the present invention are included in the scope of the present disclosure.

What is claimed is:

1. A touch controller, comprising:
   an analog front end circuit;
   an analog-to-digital converter, coupled to the analog front end circuit;
   a monitoring circuit, coupled to the analog-to-digital converter, wherein the monitoring circuit is configured to detect a sensing signal generated via a touch sensor, the analog front end circuit and the analog-to-digital converter sequentially when a display panel is driven, and obtain at least one synchronizing signal according to the sensing signal, and the sensing signal is related to a scan line of the display panel and unrelated to a data line of the display panel; and
   a touch detecting circuit, configured to output a touch driving signal to the touch sensor according to the synchronizing signal.

2. The touch controller of claim 1, wherein the sensing signal is a stray current generated by the coupling of a panel driving signal between the touch sensor and the display panel, wherein the panel driving signal is outputted when a display driving circuit drives the display panel.

3. The touch controller of claim 1, wherein the sensing signal is transmitted to the monitoring circuit via a coupling capacitor formed between the scan line of the display panel and a sensing electrode of the touch sensor, and the monitoring circuit generates the synchronizing signal only when the sensing electrode of the touch sensor is driven in response to a touch from a user.

4. The touch controller of claim 1, wherein the synchronizing signal is obtained directly according to the sensing signal, or the synchronizing signal is extracted or calculated from the sensing signal according to frequency and phase of the sensing signal by the monitoring circuit.

5. The touch controller of claim 1, wherein the touch detecting circuit and the monitoring circuit are integrated or packed as one piece or the touch detecting circuit is formed as a single chip, and the monitoring circuit is disposed outside of the touch detecting circuit; and the monitoring circuit and the touch controller multiplex at least one sensing electrode of the touch sensor.

6. The touch controller of claim 1, wherein when the monitoring circuit obtains the sensing signal, a driving electrode of the touch sensor is driven by the touch driving signal outputted by the touch detecting circuit.

7. The touch controller of claim 1, wherein the synchronizing signal and the touch driving signal are in delayed synchronization states.

8. The touch controller of claim 1, wherein the synchronizing signal comprises at least one of a horizontal synchronizing signal and a vertical synchronizing signal.

9. A touch display system, comprising:

a display driving circuit, configured to drive a display panel; and a touch controller, wherein the touch controller is configured to detect a touch operation sensed by a touch sensor, and the touch controller includes:

an analog front end circuit;

an analog-to-digital converter, coupled to the analog front end circuit;

a monitoring circuit, coupled to the analog-to-digital converter, wherein the monitoring circuit is configured to detect a sensing signal generated via the touch sensor, the analog front end circuit and the analog-to-digital converter sequentially when the display panel is driven by the display driving circuit, and obtain at least one synchronizing signal according to the sensing signal, and the sensing signal is related to a scan line of the display panel and unrelated to a data line of the display panel; and a touch detecting circuit, configured to output a touch driving signal to the touch sensor according to the synchronizing signal.

10. The touch display system of claim 9, wherein the sensing signal is a stray current generated by the coupling of a panel driving signal between the touch sensor and the display panel, wherein the panel driving signal is outputted when the display driving circuit drives the display panel.

11. The touch display system of claim 9, wherein the sensing signal is transmitted to the monitoring circuit via a coupling capacitor formed between the scan line of the display panel and a sensing electrode of the touch sensor, and the monitoring circuit generates the synchronizing signal only when the sensing electrode of the touch sensor is driven in response to a touch from a user.

12. The touch display system of claim 9, wherein the synchronizing signal is obtained directly according to the sensing signal, or the synchronizing signal is extracted or calculated from the sensing signal according to frequency and phase of the sensing signal by the monitoring circuit.

13. The touch display system of claim 9, wherein the touch detecting circuit and the monitoring circuit are integrated or packed as one piece or the touch detecting circuit is formed as a single chip, and the monitoring circuit is disposed outside of the touch detecting circuit; and the monitoring circuit and the touch controller multiplex the at least one sensing electrode of the touch sensor.

14. The touch display system of claim 9, wherein when the monitoring circuit obtains the sensing signal, a driving electrode of the touch sensor is driven by the touch driving signal outputted by the touch detecting circuit.

15. The touch display system of claim 9, wherein the synchronizing signal and the touch driving signal are in delayed synchronization states.

16. The touch display system of claim 9, wherein the synchronizing signal comprises at least one of a horizontal synchronizing signal and a vertical synchronizing signal.

17. A method for synchronizing a touch display for use in a touch display system, wherein in touch display system includes a display panel, a display driving circuit, a touch sensor, a monitoring circuit and a touch controller, and the method comprises:

using the display driving circuit to drive the display panel to generate a sensing signal, wherein the sensing signal is related to a scan line of the display panel and unrelated to a data line of the display panel;

using the monitoring circuit to detect the sensing signal, and generate at least one synchronizing signal according to the sensing signal; and using the touch controller to output a touch driving signal to synchronize with the display panel according to the at least one synchronizing signal.

18. The method for synchronizing a touch display of claim 17, wherein the touch controller obtains the synchronizing signal according to frequency or the phase of the sensing signal.

19. The method for synchronizing a touch display of claim 17, wherein the sensing signal is a stray current generated by the coupling of a panel driving signal between the touch sensor and the display panel, wherein the panel driving signal is outputted when the display driving circuit drives the display panel.

20. The method for synchronizing a touch display of claim 17, wherein when the monitoring circuit obtains the sensing signal, a driving electrode of the touch sensor is driven by the touch driving signal of the touch controller to output.

* * * * *